United States Patent [19]
Williams

[11] Patent Number: 5,954,307
[45] Date of Patent: Sep. 21, 1999

[54] SEISMIC RESTRAINT FOR CASTORED EQUIPMENT

[75] Inventor: Hal Williams, San Clemente, Calif.

[73] Assignee: Johnson & Johnson Medical, Inc., Arlington, Tex.

[21] Appl. No.: 08/865,303

[22] Filed: May 29, 1997

Related U.S. Application Data

[60] Provisional application No. 60/018,636, May 30, 1996.

[51] Int. Cl.$^6$ .................................................. A47B 97/00
[52] U.S. Cl. ..................... 248/501; 248/544; 52/DIG. 11
[58] Field of Search ..................................... 248/544, 547, 248/561, 651, 649, 501, 346.11, 646, 673, 680, 681, 500; 52/DIG. 11

[56] References Cited

U.S. PATENT DOCUMENTS

| | | | |
|---|---|---|---|
| 2,331,060 | 10/1943 | Turner | 248/501 |
| 4,700,989 | 10/1987 | Ercilla | 248/501 |
| 4,836,597 | 6/1989 | Izumida | 248/501 |
| 5,542,748 | 8/1996 | Barile | 248/501 |

Primary Examiner—Ramon O. Ramirez
Assistant Examiner—Willie Berry, Jr.
Attorney, Agent, or Firm—Andrew C Farmer

[57] ABSTRACT

An apparatus releasably clamps a wheeled or castored object to the floor or other surface to thereby restrain its movement during a seismic event such as an earthquake. The apparatus comprises a pair of wheel tracks or receivers which guide the castors into position whereby a pair of horizontally projecting pins on the receivers enter corresponding openings on the object and snubbers on the receivers abut the object. An overcenter locking clamp releasably holds the object in place.

12 Claims, 6 Drawing Sheets

SEISMIC RESTRAINT FOR CASTORED EQUIPMENT

This appln claims the benefit of U.S. Provisional Appln No. 60/018,636, filed May 30, 1996.

FIELD OF THE INVENTION

The present invention relates to an apparatus and method for anchoring castored equipment to thereby hold the equipment in place during a seismic event.

BACKGROUND OF THE INVENTION

Castors provided on equipment, including furniture, ease transport of such equipment. However, during an earthquake or other seismic event, the castors may allow the equipment to roll about uncontrollably creating potential dangers for persons or physical items located nearby. Further, the equipment itself may become damaged. Certain environments, such as aboard moving vessels such as trains, ships, airplanes and the like, move in a fashion to dislodge equipment thereon. Shaking and seismic like movements can be generated by other events such as large passing vehicles or windy conditions. It is a common feature of of some tall buildings that the upper floors sway constantly in high winds. Accordingly, a need exists for releasably anchoring mobile equipment to prevent it from moving in such conditions. Equipment provided with castors in particular require such anchoring so as to retain the benefits of the castors without incurring the dangers thereof during a seismic or seismic like event.

Preferably, such anchoring should easily be accessible, in particular, it is preferred to have the anchoring system accessible from the front of the equipment so as not to limit how the equipment is placed against walls and the like. For instance, one should be able to place the equipment into an alcove so that it is surrounded by three walls and still access the anchoring system from the front.

Recently, the State of California has passed laws and regulations requiring certain equipment, particularly in hospital environments, to be anchored in place so that it does not move about during a seismic event. Thus, damage to persons and property is minimized. Further, in a hospital environment, such anchoring of equipment helps to maintain hospital services after the seismic event has passed.

SUMMARY OF THE INVENTION

The present invention provides an apparatus and a method for releasably anchoring castored equipment to minimize damage to equipment and personnel during a seismic or seismic-like event.

An anchoring apparatus according to the invention releasably anchors an object to a supporting surface, such as a floor. The anchoring apparatus comprises a first member on the object and a receiving means on the supporting surface for slidably receiving the first member and restraining the movement thereof in at least one degree of freedom. Further, a releasable clamp is provided which comprises a base on the supporting surface, an anchor on the object and a releasable interconnect between the base and the anchor.

Preferably, the first member comprises a wheel on the object and the receiving means comprises a track having first and second opposing surfaces between which the wheel may be rolled. One of the first member and the receiving means preferably further comprises a pin and the other of the first member and receiving means comprises a tube for slidably receiving the pin, the tube and pin preferably being horizontal. A snubber can be provided between the object and the receiving means.

Preferably, the releasable interconnect comprises an over-center locking means. One suitable over-center locking means comprises an actuator having first and second actuator pivots and a clamp arm having an engagement means for engaging one of the base and anchor, and first and second clamp arm pivots. The first clamp arm pivot is fixed relative to the actuator first pivot and also relative to the other of the base and anchor. A pivot arm has a pivot pivotally connected to the actuator at the actuator second pivot and also has a second pivot pivotally connected to the clamp arm at the clamp arm second pivot. The actuator and clamp arm are thus interlinked by the pivot arm so that movement of the actuator about its first pivot induces movement of the clamp arm about its first pivot between a first engaged position and a second disengaged position When the clamp arm is in the first position, the pivot arm is positioned so that a torqe applied to the clamp arm about its first pivot to urge it away from the second position applies a torque, through the clamp arm, to the pivot arm about its first pivot to urge the pivot arm in a first angular direction. When the clamp arm is in the second position, the pivot arm is positioned so that when the torque is applied to the clamp arm about its first pivot the torque induced thereby in the pivot arm about its first pivot is no greater than zero. When the torque is less than zero the pivot arm is urged in an opposite angular direction and when the torque is zero the pivot arm is not urged thereby about its first pivot. In either event, movement of the clamp arm away from the second position is inhibited.

Preferably, the actuator has an actuation surface removed from its first pivot which is oriented to be operated by a user's foot. The engagement means can comprise a cup and the portion of the base or anchor with which it engages can comprise a projection receivable within the cup. Preferably, the base is located beneath the object to minimize tripping hazards.

DETAILED DESCRIPTION

Figure 1:
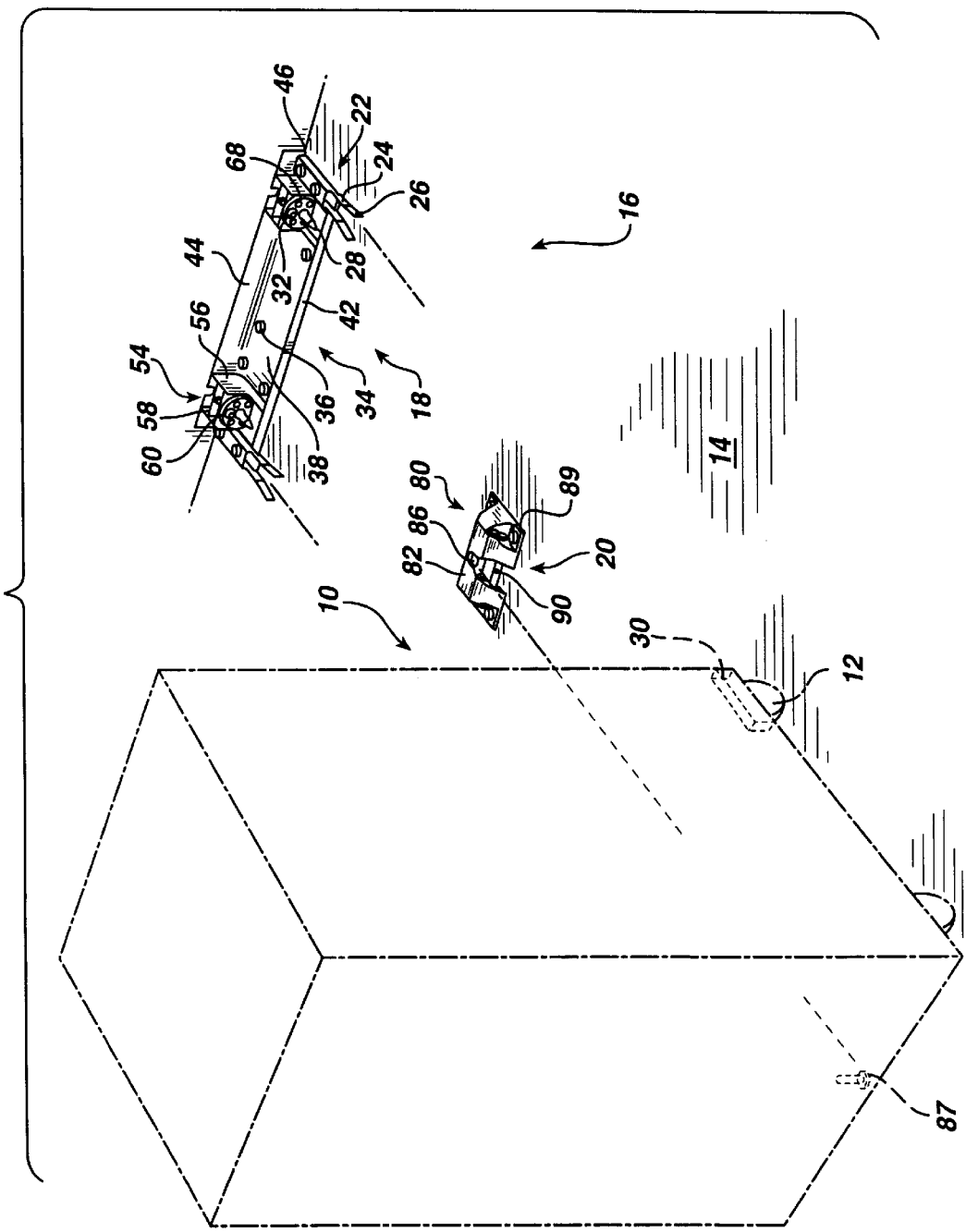
FIG. 1 is a perspective view of an anchoring apparatus according to the present invention.

Turning now to the drawings, and to FIG. 1 in particular, an object 10, such as a hospital sterilizer, particularly, a hydrogen peroxide based gas plasma sterilizer, has castors 12 thereon for mobility across a supporting surface 14, such as a floor. An anchoring apparatus 16 for anchoring the object 10 to the supporting surface 14 comprises in gross a receiver 18 for slidably receiving a portion of the object 10 and a releasable clamp 20.

Figure 2:
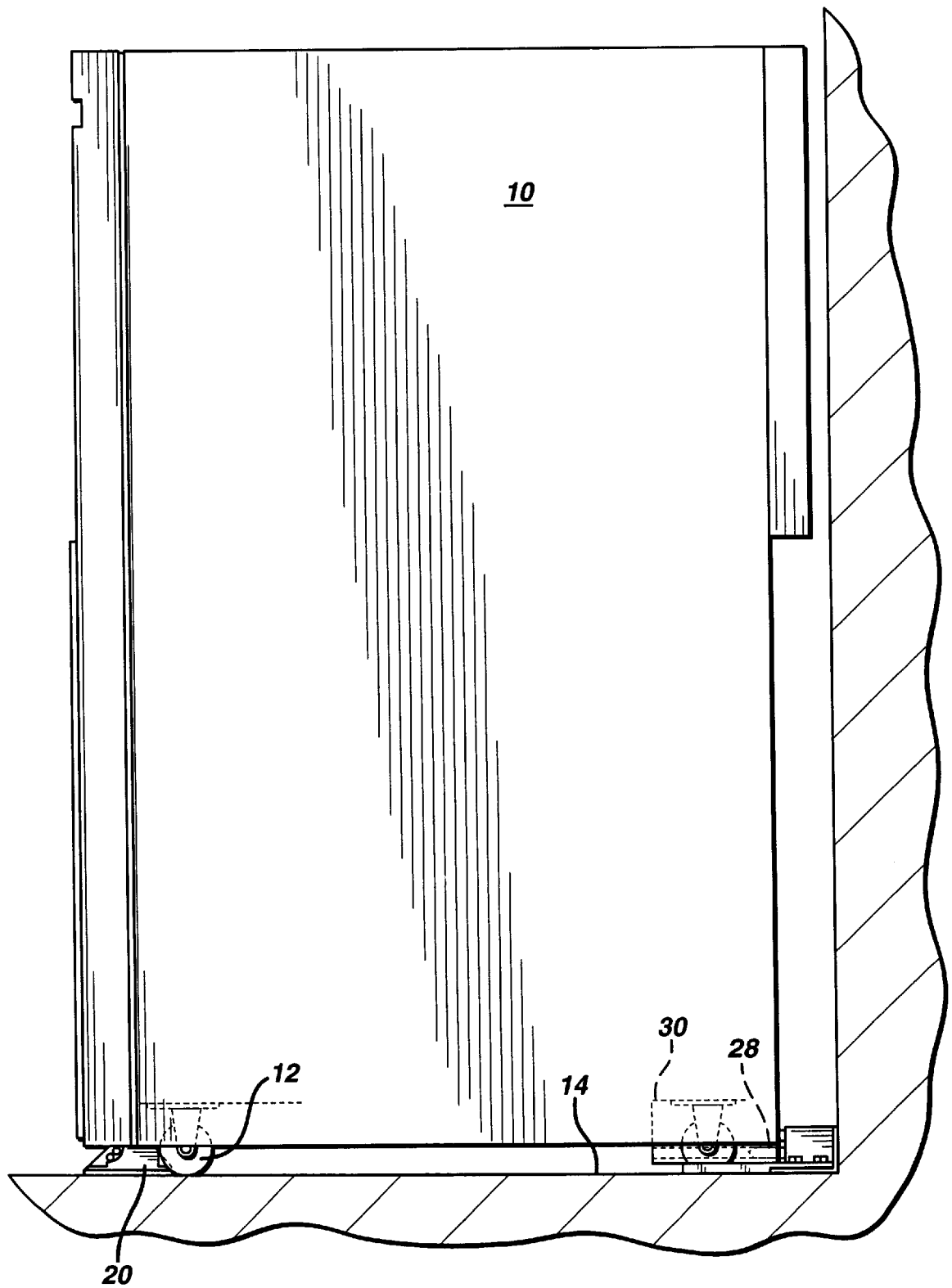
FIG. 2 is a side elavational view of the anchoring apparatus of FIG. 1 showing a castored piece of equipment being anchored thereby.

The receiver 18 has a pair of track-like wheel receivers 22 comprising opposing side-members 24 with an outwardly flaring entrance 26 whereby the castors 12 may be guided into the wheel receivers 22 through the flaring entrance 26 to be received between the opposing side-members 24. Adjacent to each wheel receiver 22, a pin 28 projects horizontally outwardly and is receivable within an opening 29 in a tube 30 on the object 10 to thereby prevent lateral movement of the object 10. An elastomeric snubber 32 projects horizontally outwardly adjacent each pin 28 to abut the object 10 and cushion horizontal interactions between the object 10 and the receiver 18. The wheel receivers 22, pins 28, and snubber 32 are interconnected by a sturdy frame 34 which is affixed to the supporting surface 14 as by bolts 36 or other appropriate means. FIG. 2 illustrates the object 10 as received within the anchoring apparatus 16.

Figure 3:
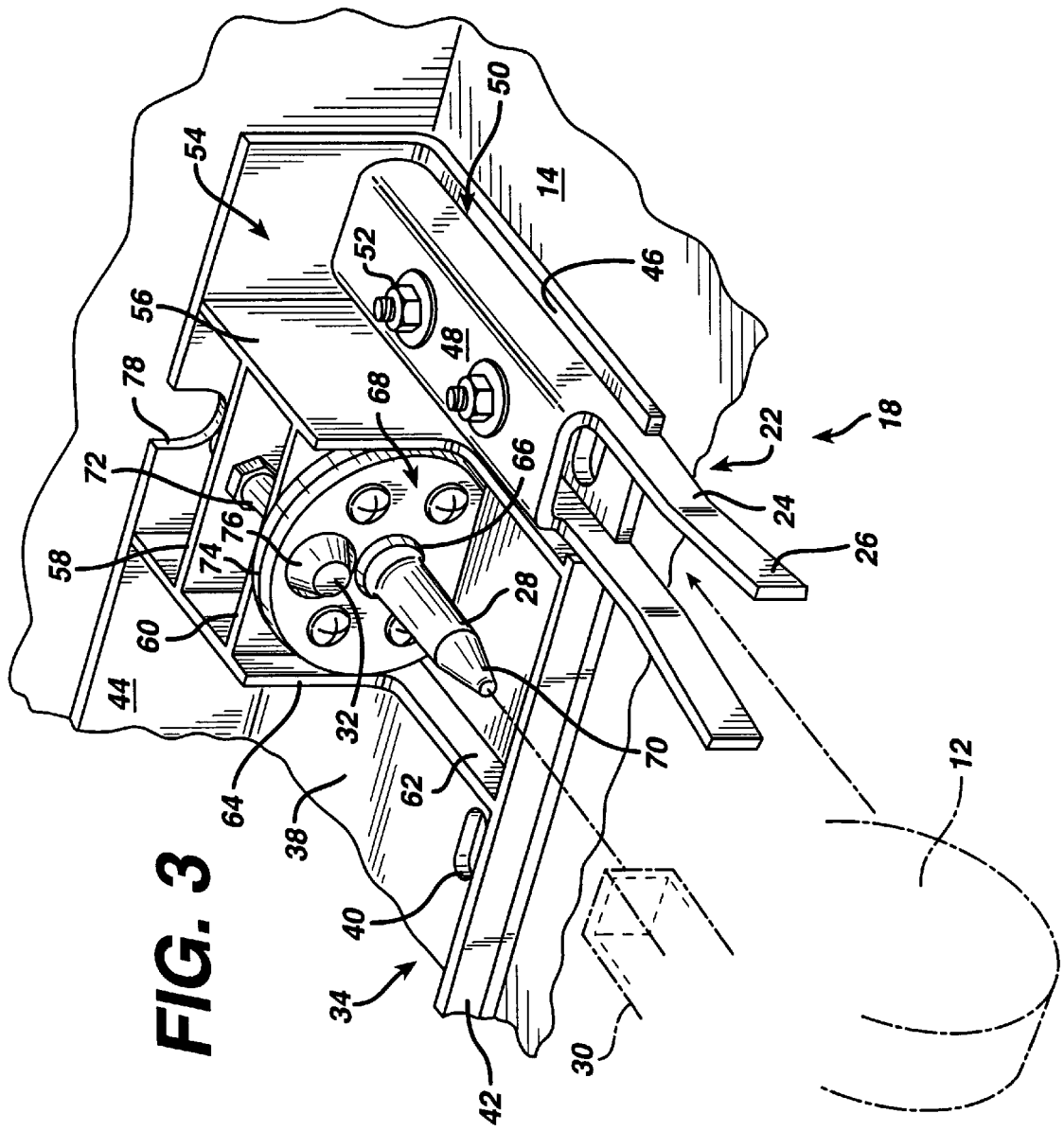
FIG. 3 is a perspective view of a receiving portion of the clamping apparatus of FIG. 1 showing a wheel guide for receiving a castor wheel of the object a pin for insertion into an opening on the object and a snubber for abutting the object.

FIG. 3 illustrates in more detail the receiver 18. Its frame 34 comprises a baseplate 38 having apertures 40 therethrough for bolting to the supporting surface 14. A low profile vertical front rib 42 and a somewhat higher profile rear wall 44 provide rigidity to the baseplate 38.

The wheel receivers 22 affix to the frame 34 at the outside, opposing lateral extents 46 thereof. The wheel receivers 22 have an inverted U-shape, with an upper wall 48 connecting the side-members 24 at a rearward portion of the wheel receiver 22. Bolts 52 extend through the base plate 38 and upper wall 48 to firmly affix the wheel receivers 22 to the frame 34.

Sturdy subframes 54 support each of the pins 28 and snubbers 32 upon the frame 34. A pair of opposing sidewalls 56 which extend from and oblique to the baseplate 38 and rear wall 44 of the frame 34. A midwall 58 and a front wall 60, spaced apart from each other, and parallel to the rear wall 44, interconnect the sidewalls 56. Low profile ribs 62 extend from leading edges 64 of the sidewalls 56 to abut the front rib 42 and enhance the rigidity of the frame 34 and subframe 54.

The pin 28 extends perpendicularly from a central portion 66 of a baseplate 68, which in turn bolts onto the subframe front wall 60. A forward end 70 of the pin 28 is tapered to ease its insertion into the opening 29 on the object 10. The snubber 32 is supported on a bolt 72 affixed to the midwall 58 and which extends through apertures 72 and 74 through the front wall 60 and pin baseplate 68 respectively. An aperture 78 in the rear wall 44 adjacent the snubber bolt 72 provide tool access thereto.

Figure 4:
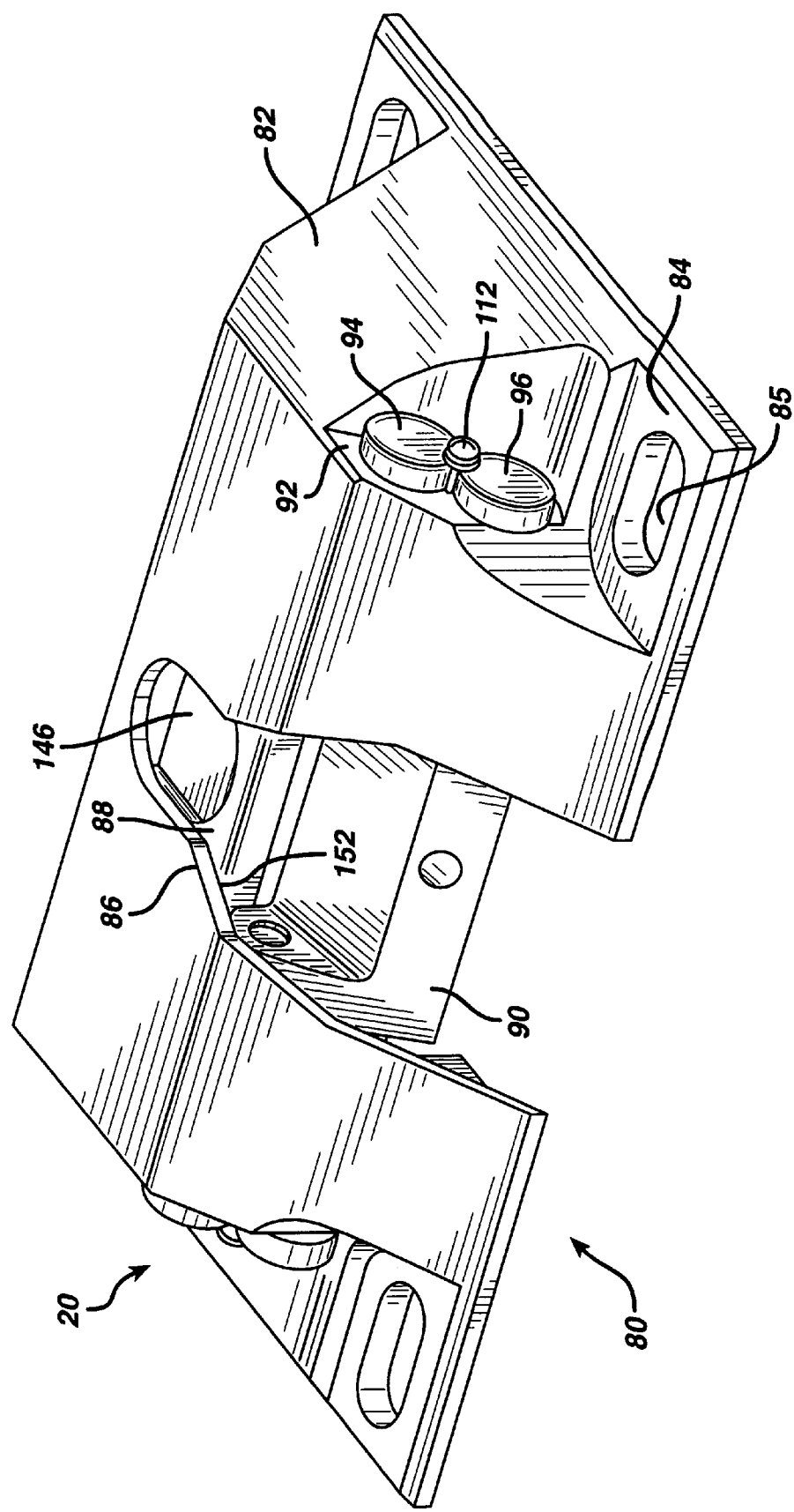
FIG. 4 is a perspective view of a clamping mechanism of the anchoring apparatus of FIG. 1.

FIGS. 4 to 8 illustrate the clamp 20 in more detail. As best seen in FIG. 4, the clamp 20 has a housing 80 with an inverted cup shaped configuration. A domed portion 82 of the housing 80 has a smooth exterior appearance to reduce tripping hazards. Bolting flanges 84 extend outwardly from the domed portion 82 in the corners of the housing 80 and have elongated bolting apertures 85 therethrough whereby the housing 80 may be bolted to the supporting surface 14 (not shown in FIG. 4). A large V-shaped opening 86 in the domed portion 82 guides a bolthead 87 on the object 10 (see FIG. 1) into the clamp housing 80.

Figure 5:
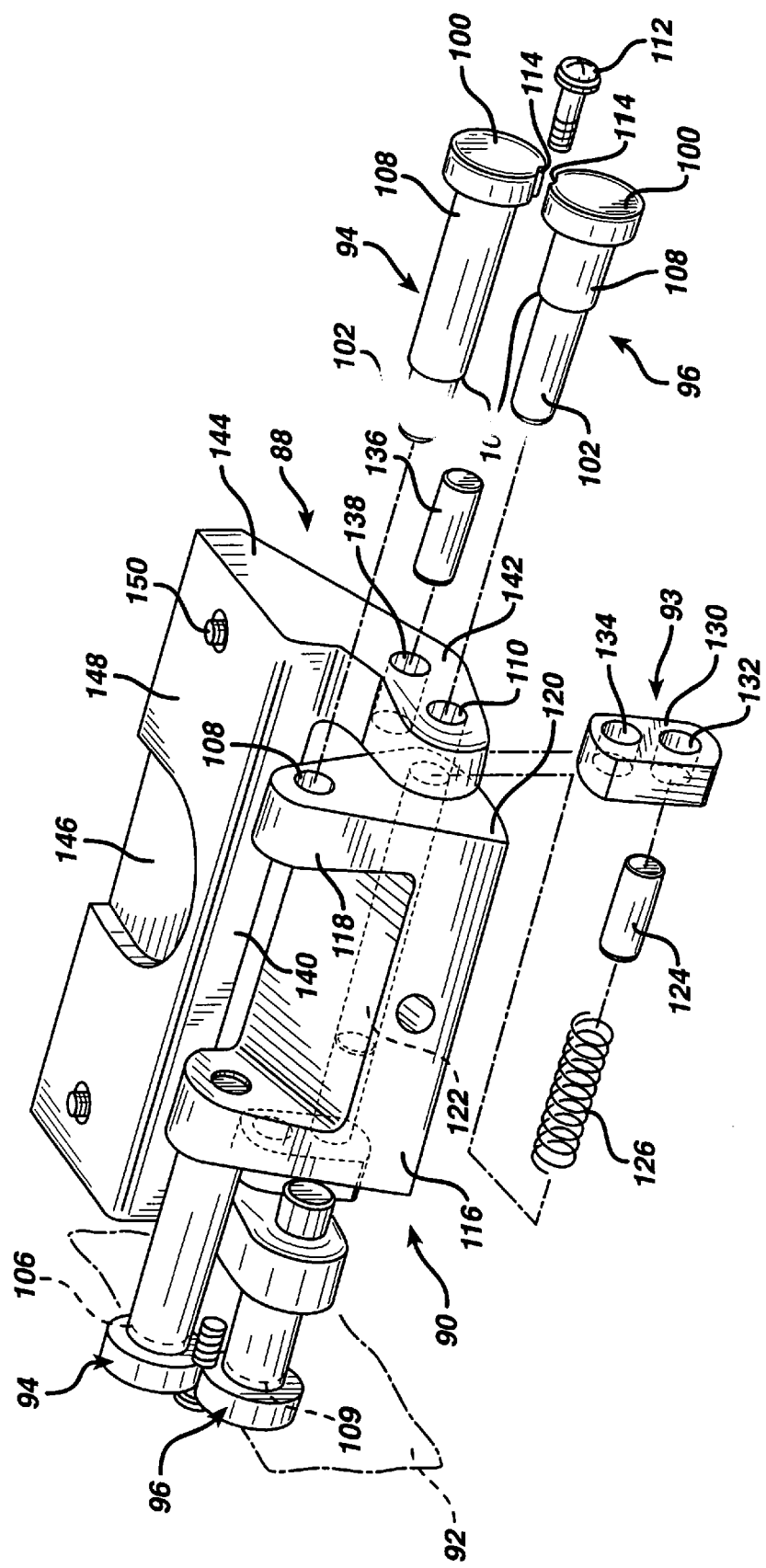
FIG. 5 is a perspective exploded view of a portion of the clamping mechanism of FIG. 4.

Turning also to FIG. 5, the clamp 20 further comprises a clamp arm 88 and an actuator 90 which are rotatably mounted to opposing sidewalls 92 in the domed portion 82 of the clamp housing 80. A pair of pivot arms 93 interconnect the actuator 90 and clamp arm 88. As will be more fully explained hereinafter, the linkage thus formed between the actuator 90, pivot arms 93 and clamp arm 88 provides an overcenter-type locking action whereby movement of the actuator 90 causes the clamp arm 88 to rotate into and out of engagement with the bolthead 87 (not shown in FIG. 5) and whereby the clamp arm 88 will stay firmly engaged with the bolthead 87 until released by movement of the actuator 90.

A portion of the housing sidewall 92 is shown in phantom in FIG. 5 to illustrate how a pair of actuator pintles 94 and clamp arm pintles 96 mount the actuator 90 and clamp arm 88 to the clamp housing 80. Each of the pintles 94 and 96 comprises an elongated cylindrical body portion 98, an enlarged circular head 100 at one end and a reduced diameter portion 102 at the opposite end thereby forming an annular shoulder 104 between the body portion 98 and reduced diameter portion 102.

The body portion 98 of each of the actuator pintles 94 is received within apertures 106 through the housing sidewalls 92 with the head 100 abutting the sidewall 92. The shoulder 104 abuts the actuator 90 to restrain its lateral movement and the reduced diameter portion 102 is received within apertures 108 on the actuator 90 with sufficient clearance therebetween to allow the actuator 90 to rotate about the actuator pintles 94.

The clamp arm pintles 96 are similarly received within apertures 109 in the sidewalls 92 and apertures 110 in the clamp arm 88 whereby the clamp arm 88 freely pivots about the reduced diameter portion 102 of the clamp arm pintles 96. Hold down screws 112 extend past notches 114 in the actuator and clamp arm pintle heads 100 and bolt into the opposing sidewalls 92 thereby holding the pintles 94 and 96 securely in place.

The actuator 90 comprises a lateral body 116 with a pair of lugs 118 extending upwardly from opposing lateral ends 120 thereof. The pintle apertures 108 are located on the lugs 118. A lateral bore 122 extends laterally through the body 116 in parallel with the apertures 108. A pair of pins 124, with a coil spring 126 therebetween, are positioned within the bore 122 and extending outwardly thereof.

Each of the pivot arms 93 interconnecting the actuator 90 and clamp arm 88 comprises an elongated body 130 with first and second, spaced apart, parallel apertures 132 and 134 therethrough. The first apertures 132 receive the pins 124 extending outwardly of the actuator lateral bore 122. A second set of pins 136 extends through apertures 138 in the clamp arm 96 and into the second apertures 134 on the pivot arms 93. The apertures 138 are spaced apart from, and parallel to, the pintle apertures 110 and the pivot arm 93 pivots freely on the pins 136 and 124. Accordingly, pivoting action of the actuator 90 about the actuator pintles 94 is transmitted through the pivot arms 93 to the clamp arm 88 to induce its rotation about the clamp arm pintles 96.

Figure 6:
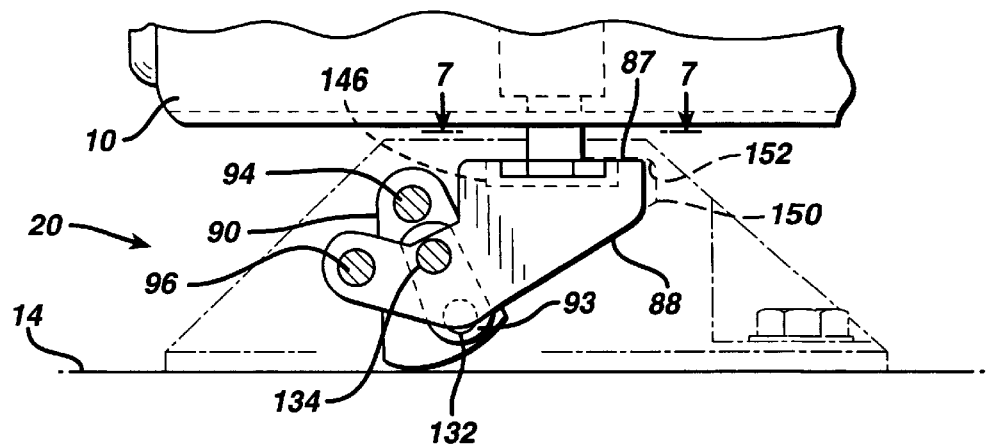
FIG. 6 is a side elevational view in partial phantom of the clamping mechanism of FIG. 4, showing the clamping mechanism in an engaged postion.
Figure 7:
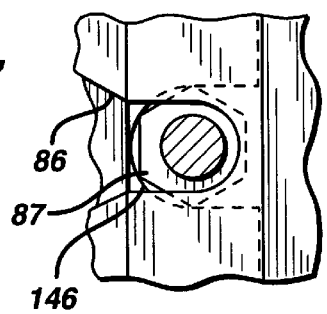
FIG. 7 is a sectional view taken along lines 7—7 of FIG. 6 and showing the interconnection between a bolthead on the object and a receiving portion of a clamping arm of the clamping mechanism.
Figure 8:
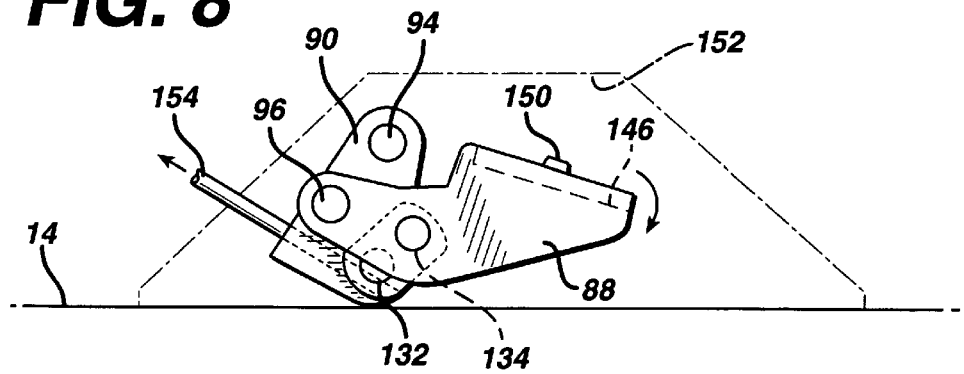
FIG. 8 is a side elevational view in partial phantom of the clamping mechanism of FIG. 4, showing the clamping mechanism in a disengaged postion.

The clamp arm 96 comprises a lateral body 140 having a pair of mounting arms 142 depending downwardly and forwardly from lateral edges 144 thereof. The pintle apertures 110 and swing arm pin apertures 136 penetrate the mounting arms 142. Turning also to FIG. 6, a receiving well 146 on an upper surface 148 of the clamp arm body 140 is adapted to receive the bolt head 87 which projects downwardly from the object 10. As illustrated in FIGS. 6–8, as the actuator pivots forwardly (to the left or clockwise as seen in FIG. 8) it drives, through the pivot arms 93, the clamp arm 88 to pivot clockwise so that the receiving well 146 moves downwardly away from the bolt head 87. Conversely, as the actuator pivots rearwardly, the clamp arm 88 pivots upwardly to seat the bolt head 87 within the receiving well 146 and thereby prevent lateral movement of the object 10.

The pivot arms 93 provide an overcenter-type locking feature. As the clamp arm 88 rotates upwardly (counter clockwise as seen in FIGS. 6 and 8), the pivot arm 93 similarly rotates counter-clockwise. During this phase, a clockwise rotational force applied to the clamp arm 88 would urge the pivot arm 93 to similarly turn clockwise about the pins 124 in the actuator body lateral bore 122. However, at a certain point in the upward, counter-clockwise rotation of the clamp arm 88, the pivot arms 93 reached an overcenter position wherein a downward, clockwise rotation of the clamp arm 88 would tend to urge the pivot arm 93 in a counter-clockwise, not clockwise, rotation about the pins 124 in the actuator body lateral bore 122. Interference between the clamp arm body 140 and the actuator 90, prevents the pivot arms 93 from continuing rotation beyond this overcenter position. Preferably, the axes of rotation defined by the actuator pins 94 and by the pins 136 in the first and second apertures 132 and 134 of the pivot arm 93 are in linear alignment or aligned such that the axis defined by the second aperture 134 has moved slightly past an imaginary line between the axes defined by pin 94 and pin 136 in the first aperture 132. However, it will be appreciated by those of skill in the art, that other known or yet to be discovered over-center mechansims may be substituted here.

Further, as best seen in FIG. 6, as the clamp arm 88 rotates fully upwardly, a pair of set screws 150 engage an upper surface 152 of the clamp housing 80. The set screws 150 are adjusted so that when the clamp arm 88 is tightly pressed against the housing surface 152, the pivot arms 93 are positioned such that the downward rotational forces applied to the clamp arms induce no angular movement of the pivot arms. Thus, the frictional forces induced by the tight engagement between the clamp arm 88 and the housing surface 152 coupled with the position of the pivot 93 holds the clamp arm 88 in a full upward and locked position as shown in FIG. 6. To unlock the clamp arm 88, a clockwise rotation must be applied to the actuator 90 as by a handle 154 projecting laterally therefrom.

The present apparatus thus provides a convenient method for releasably securing the object 10. To secure the object 10, it is wheeled on its castors 12 (see FIG. 1) into position over the receiver 18 and clamp 20. The castors 12 are guided into the entrance flair 26 of the wheel receivers 22. This guides the pins 28 on the receiver 18 into the tube openings 29 on the object 10. As the object 10 becomes fully positioned within the receiver 18, the bolt head 87 moves into the V-shaped opening 86 in the clamp housing 80. The operator then merely moves the clamp actuator 90 rearwardly to pivot the clamp arm 88 upwardly and into engagement with the bolt head 87. Now, the object 10 is securely affixed to the supporting surface 14. The overcenter locking of the clamp 20 holds it in place until released through operator induced movement of the actuator 90.

During a seismic event, the clamp 20 and the interaction of the pins 28 within the tubes 30 restrain lateral and vertical movement of the object 10. The snubbers 32 restrain rearward movement of the object 10. Forward movement of the object 10 is restrained by the clamp 20.

When an operator desires to move the object 10, he or she simply draws the actuator 90 forwardly to rotate the pivot arms 93 out of the overcenter condition and to rotate the clamp arm 88 out of engagement with the bolthead 87. The object may then be wheeled about on its castors 87.

While the invention has been particularly described in connection with specific embodiments thereof, it is to be understood that this is by way of illustration and not of limitation, and that the scope of the appended claims should be construed as broadly as the prior art will permit.

What is claimed is:

1. An anchoring apparatus for releasably anchoring an object to a supporting surface, the anchoring apparatus comprising:

a first member adapted to be on the object and a receiving means adapted to be on the supporting surface for slidably receiving the first member and restraining the movement thereof in at least one degree of freedom;

a releasable clamp comprising a base adapted to be on the supporting surface, an anchor adapted to be on the object and a releasable interconnect between the base and the anchor adapted to be connectable therebetween when the first member is received within the receiving means; and wherein the first member comprises a wheel and the receiving means comprises a track having first and second opposing surfaces between which the wheel may be rolled.

2. An anchoring apparatus according to claim 1 wherein one of the first member and the receiving means comprises a pin and the other of the first member and receiving means comprises a tube for slidably receiving the pin.

3. An anchoring apparatus according to claim 2 wherein the pin and the tube are horizontal whereby the at least one degree of freedom is horizontal.

4. An anchoring apparatus according to claim 3 and further comprising a snubber between the object and the receiving means.

5. An anchoring apparatus according to claim 1 wherein the releasable interconnect comprises an over-center locking means.

6. An anchoring apparatus according to claim 5 wherein the over-center locking means comprises:

an actuator having first and second actuator pivots;

a clamp arm having an engagement means for engaging one of the base and anchor, and first and second clamp arm pivots, the first clamp arm pivot being fixed relative to the actuator first pivot and also relative to the other of the base and anchor; and a pivot arm having first and second pivots, the first pivot arm pivot being pivotally connected to the actuator at the actuator second pivot and the second pivot arm pivot being pivotally connected to the clamp arm at the clamp arm second pivot;

wherein movement of the actuator about its first pivot induces movement of the clamp arm about its first pivot between a first position in which the engagement means is out of engagement with the one of the base and anchor and a second position in which the engagement means is in engagement with the one of the base and anchor; and wherein when the clamp arm is in the first position, the pivot arm is positioned so that a first torqe applied to the clamp arm about its first pivot to urge it away from the second position applies a positive second torque, through the clamp arm, to the pivot arm about its first pivot to urge the pivot arm in a first angular direction thereabout and when the clamp arm is in the second position, the pivot arm is positioned so that when the first torque is applied to the clamp arm about its first pivot the second torque induced thereby in the pivot arm about its first pivot is no greater than zero whereby when the second torque is less than zero the pivot arm is urged in a second angular direction opposite from the first angular direction and when the second torque is zero the pivot arm is not urged thereby about its first pivot, whereby the movement of the clamp arm away from the second position is inhibited.

7. An anchoring apparatus according to claim 6 wherein the actuator has an actuation surface removed from its first pivot which is oriented to be operated by a user's foot.

8. An anchoring apparatus according to claim 6 wherein the engagement means comprises a cup and the one of the base and anchor comprises a projection receivable within the cup when the clamp arm is in the second position.

9. An anchoring apparatus according to claim 6 wherein the base is located beneath the object whereby to minimize tripping hazards therefrom.

10. An anchoring apparatus according to claim 1 wherein one of the first member and the receiving means comprises a pin and the other of the first member and receiving means comprises a tube for slidably receiving the pin.

11. An anchoring apparatus for releasably anchoring an object to a supporting surface, the anchoring apparatus comprising:

a first member adapted to be on the object and a receiving means adapted to be on the supporting surface for slidably receiving the first member and restraining the movement thereof in at least one degree of freedom;

a releasable clamp comprising a base adapted to be on the supporting surface, an anchor adapted to be on the object and a releasable interconnect between the base and the anchor connectable therebetween when the first member is received within the receiving means; and wherein the clamp is accessible and actuable from the front of the object, whereby a user need not reach the clamp from either the rear or either side of the object.

12. An apparatus for releasably anchoring an object to a supporting surface, the anchoring apparatus comprising:

a first member adapted to be on the object and a receiving means adapted to be on the supporting surface for slidably receiving the first member and restraining the movement thereof in at least one degree of freedom;

a releasable clamp comprising a base adapted to be on the supporting surface, an anchor adapted to be on the object and a releasable interconnect between the base and the anchor connectable therebetween when the first member is received within the receiving means; and wherein the object is adapted to be provided with a friction reducing means comprising one or more wheels.

* * * * *